E. F. PAYNTER.
AIR VALVE FOR COMBUSTION ENGINES.
APPLICATION FILED APR. 13, 1915.
1,195,715.
Patented Aug. 22, 1916.
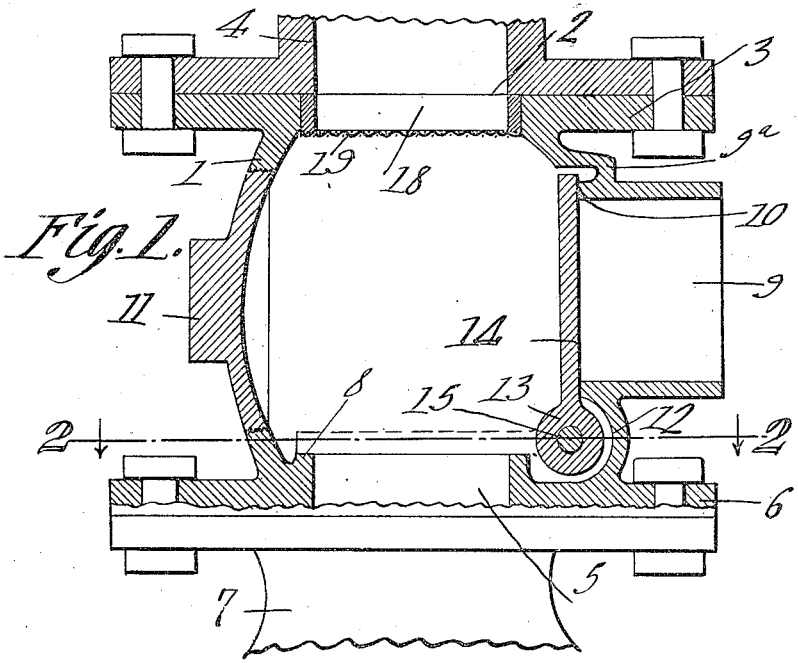
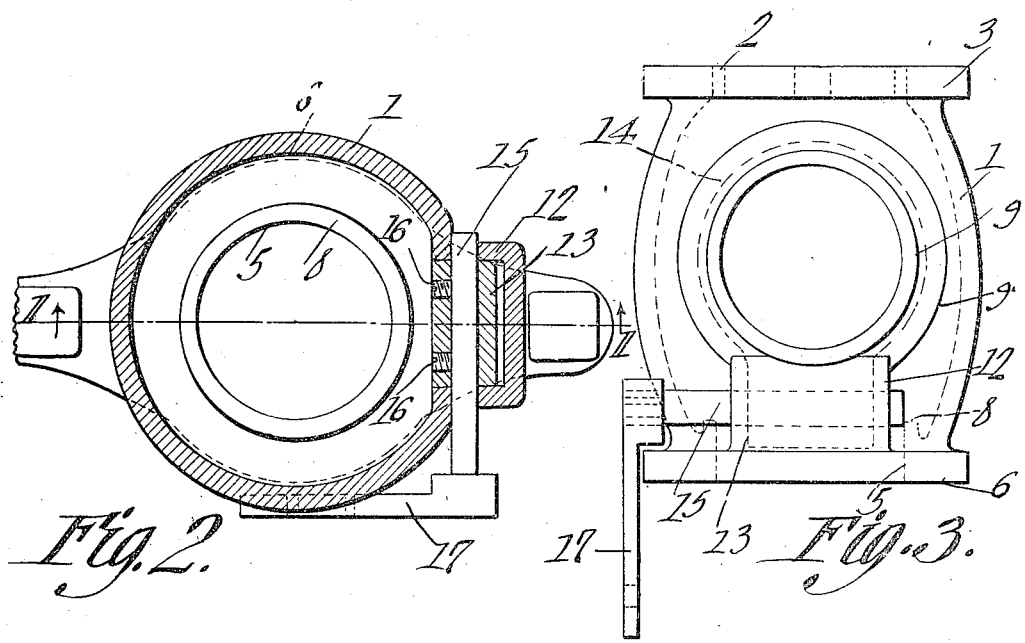
E. F. Paynter
Inventor
Witnesses

UNITED STATES PATENT OFFICE.

EARL F. PAYNTER, OF FRANKLINVILLE, NEW YORK.

AIR-VALVE FOR COMBUSTION-ENGINES.

1,195,715.

Specification of Letters Patent.

Patented Aug. 22, 1916.

Application filed April 13, 1915. Serial No. 21,082.

*To all whom it may concern:*

Be it known that I, EARL F. PAYNTER, a citizen of the United States, residing at Franklinville, in the county of Cattaraugus and State of New York, have invented a new and useful Air-Valve for Combustion-Engines, of which the following is a specification.

The present invention appertains to an air valve adapted to be interposed between the carbureter and intake manifold of an intake combustion engine, and which is of such construction and operation that it may be controlled for admitting fresh air into the intake manifold to commingle with the carbureted air, and to enable the flow of carbureted air to be shut off and at the same time to allow fresh air only to be drawn into the cylinders of the engine.

The present device having the foregoing features is of decided advantage for four reasons, viz., it enables the automobile or other machine to be stopped or retarded conveniently and promptly, it enables the engine to be braked, it permits of a saving of fuel by accelerating the quantity of air, and it will also enable the engine cylinders to be cooled.

The cardinal feature of the invention is the provision of a valve structure adapted to be interposed between the intake manifold of an internal combustion engine and the carbureter, and having a fresh air inlet port, and means for controlling the inlet of fresh air and the flow of carbureted air from the carbureter into the valve casing, so that an auxiliary supply of air may be admitted into the intake manifold with the carbureted air, and so that the flow of carbureted air may be completely shut off and fresh air allowed to be sucked into the cylinders, for the intended purposes.

It is also within the scope of the invention to provide a valve structure of the nature indicated, which is comparatively simple and inexpensive, as well as being convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:—

Figure 1 is a median section of the valve structure taken on the line 1—1 of Fig. 2, and illustrating the same attached to the intake manifold and carbureter. Fig. 2 is a cross section taken on the line 2—2 of Fig. 1. Fig. 3 is a side elevation of the valve structure looking toward the air inlet port.

In carrying out the invention, there is provided a "globe" valve casing 1 which is provided at one end with an outlet port 2 and a surrounding annular outturned flange 3 which is adapted to be bolted or otherwise secured to the inlet end of the intake manifold 4 of an internal combustion engine, it being understood at the outset, that the present device may be employed on automobiles, motorcycles, and other self-propelled vehicles embodying internal combustion engines. The opposite end of the casing 1 is provided with a carbureted air or fuel inlet port 5 in alinement with the port 2, there being an annular outstanding flange 6 surrounding the port 5 for bolting or otherwise securing the carbureter 7 to the casing 1 to supply the carbureted air through the port 5 into the casing 1. It is to be understood, however, that the valve casing 1 may be interposed between the carbureter and intake manifold in any suitable manner so that the carbureted air is compelled to flow through the casing 1 in passing to the engine cylinders. The casing 1 is provided with an inner annular rib 8 surrounding the port 5 and providing a valve seat. One side of the casing 1 is provided with an enlargement 9ª having a sleeve 9 outstanding therefrom to provide a fresh air inlet port intermediate the ports 2 and 5. The inner end of the sleeve 9 projects inwardly to provide an inner annular rib or valve seat 10 surrounding the inner end of the fresh air inlet port. The valve seats 8 and 10 are arranged at right angles relative to one another. It is preferable to provide that side of the casing 1 opposite the sleeve 9, with a removable portion or plug 11 whereby the valve seat 10 may be ground conveniently, and whereby the parts within the casing may be readily assembled within and removed therefrom.

The valve casing 1 is provided between the adjacent portions of the valve seats 8 and 10 with a transverse pocket or recess 12 receiving the enlarged rounded end 13 of a flap or swinging valve 14 arranged to oscillate within the casing between the two valve seats. A transverse spindle or shaft 15 is journaled through the ends of the pocket or recess 12, and the enlarged or butt portion of the valve 14 is engaged upon the spindle 15, and is secured thereto by means of set screws 16, or the like. The protruding end of the spindle 15 has a lever arm 17 secured thereto, whereby the arm 17 may be swung for oscillating the valve 14 within the casing.

A ring 18 is preferably secured within the port 2, and has a screen 19 secured to its inner side, whereby the screen 19 will strain the air or gas passing from the casing 1 into the intake manifold, and furthermore the screen 19 will act as a diffuser for causing the carbureted air and fresh air to be admixed properly when entering the intake manifold.

Any suitable actuating or operating device may be connected to the arm 17 for swinging the same, and whereby the operator may control the air valve from his seat, the operating or actuating device including a spring or other means for yieldingly holding the arm 17 at a normal position with the valve 14 bearing against the seat 10 and closing the fresh air inlet port.

In operation, supposing the casing 1 to be secured between the carbureter 7 and intake manifold 4 of an internal combustion engine, the valve 14 is normally swung against the seat 10 to close the air inlet port 9 and to open the carbureted air or fuel inlet port 5. The carbureted air or gaseous mixture may then readily flow from the carbureter through the casing 1 and into the intake manifold. When the operator desires to retard or arrest the motion of the vehicle, he may readily do so merely by swinging the valve 14 against the valve seat 8 so as to close the fuel inlet port 5, and this will prevent the further flow of the carbureted air into the intake manifold, and at the same time the fresh air inlet port will be uncovered or opened to allow fresh air to be drawn into the casing and manifold. The fresh air will then be drawn into the engine cylinders, and being compressed therein by the compression strokes of the pistons, will arrest the motion of the engine, and consequently the motion of the vehicle will be retarded. By swinging the valve 14 to an intermediate position, the carbureted air is permitted to flow through the casing into the intake manifold, and an auxiliary supply of air will be admitted through the fresh air inlet port, when it is desired to accelerate the quantity of air with respect to the fuel.

The present device provides a most convenient and efficient means for stopping the engine and vehicle, and may be used in the event that the foot brake fails to work, or may be used in connection with the foot and emergency brakes. The present device is employed in some instances, in preference to the emergency brake, and a frustrated driver may quickly stop the engine as well as the vehicle by simply operating the actuating device of the air valve, said actuating device being preferably foot controlled.

As a concrete example of how the device is operated, supposing the vehicle reaches and starts down a hill, the driver can swing the valve 14 against the valve seat 8, for shutting off the flow of carbureted air, and allowing the fresh air to enter the engine cylinders, without throwing out the clutch. Thus, the engine will be operated due to the fact that it is connected with the driving wheels, and the fresh air in entering the cylinders will be brought under compression, for creating a steady and strong braking action. This effects a saving of fuel, since the engine or motor does not use any fuel while running down the hill, and furthermore the cool air entering the engine cylinders will cool the same. The operator need not even touch the gas control, or the brake and clutch controlling devices, and as soon as the car or vehicle reaches the lower end of the hill, or the point when it is desired to again start the engine, the actuating device is simply released which swings the valve 14 back against the seat 10 so that ordinary conditions will again be resumed.

The present valve structure is therefore useful for the four purposes above indicated. First, the present device provides a dependable safety appliance for retarding the machine. Secondly, the device provides a dependable and effective engine brake. Third, the contrivance effects a saving of gasolene or fuel, and fourth, the device enables the cylinders to be cooled conveniently and effectively.

Although the device is illustrated in one specific embodiment, it is to be understood that the device may be altered in its details within the scope of the appended claim, without departing from the spirit of the invention.

Having thus described the invention, what is claimed as new is:—

A valve structure embodying a casing having an inlet port, an opposite outlet port, a second inlet port between the aforesaid ports, the casing having inner annular ribs surrounding the inlet ports and providing valve seats, a removable plug opposite the second inlet port, and a transverse pocket between the adjacent portions of the valve seats, said valve seats being arranged at right angles with one another, a transverse spindle journaled through the ends of said pocket, a swinging flat valve whose opposite faces are seatable against said seats, the valve having an enlarged portion within said pocket mounted upon said spindle, and a screen fitted within the outlet port, said plug when removed giving access to the screen, valve and valve seats.

In testimony that I claim the foregoing as my own, I have hereto affixed my signature in the presence of two witnesses.

EARL F. PAYNTER.

Witnesses:
A. B. MORGAN,
D. J. SILL.